United States Patent
Hung et al.

(10) Patent No.: US 6,789,976 B2
(45) Date of Patent: Sep. 14, 2004

(54) STEP-ROTATING DEVICE

(75) Inventors: Chien Ju Hung, Taoyuan (TW); Yi Chang Lu, Chung-Li (TW)

(73) Assignee: Hannstar Display Corp., Taipei (TW)

( * ) Notice: Subject to any disclaimer, the term of this patent is extended or adjusted under 35 U.S.C. 154(b) by 15 days.

(21) Appl. No.: 10/235,893

(22) Filed: Sep. 6, 2002

(65) Prior Publication Data
US 2003/0156891 A1 Aug. 21, 2003

(30) Foreign Application Priority Data

Feb. 20, 2002 (TW) .................................. 91202045 U

(51) Int. Cl.$^7$ ............................................. E05D 11/10
(52) U.S. Cl. ............................................. 403/84; 16/331
(58) Field of Search .......................... 403/83, 84, 96, 403/91–93; 16/328–331, 341, 334, 332; 248/921–923, 919; 361/681, 682

(56) References Cited

U.S. PATENT DOCUMENTS

| | | | | |
|---|---|---|---|---|
| 931,810 A | * | 8/1909 | Tapling | 16/329 |
| 1,532,997 A | * | 4/1925 | Golladay | 16/351 |
| 1,537,649 A | * | 5/1925 | McGlashan et al. | 296/92 |
| 2,904,299 A | * | 9/1959 | Dalton | 248/292.13 |
| 4,186,905 A | * | 2/1980 | Brudy | 248/478 |
| 4,829,633 A | * | 5/1989 | Kassner | 16/322 |
| 4,881,843 A | * | 11/1989 | Randleman | 403/92 |
| 5,317,785 A | * | 6/1994 | Kobayashi | 16/329 |
| 5,661,942 A | * | 9/1997 | Palmer | 52/653.2 |
| 5,966,776 A | * | 10/1999 | Ona | 16/328 |
| 6,305,050 B1 | * | 10/2001 | Imai | 16/303 |

FOREIGN PATENT DOCUMENTS

| | | | | |
|---|---|---|---|---|
| EP | 1103688 A2 | * | 5/2001 | E05D/11/10 |
| JP | 2001182421 A | * | 7/2001 | E05D/11/10 |

* cited by examiner

Primary Examiner—James R. Brittain
(74) Attorney, Agent, or Firm—Rabin & Berdo, P.C.

(57) ABSTRACT

A step-rotating device for rotatably connecting a first member and a second member. The step-rotating device includes a gasket movably connected to the first member and having a first surface with a hole, a base fixed on the second member and having a second surface, facing the first surface, with a shaft rotatably inserted into the hole and a plurality of annularly arranged recesses, and a plurality of rollers disposed between the gasket and the base.

15 Claims, 9 Drawing Sheets

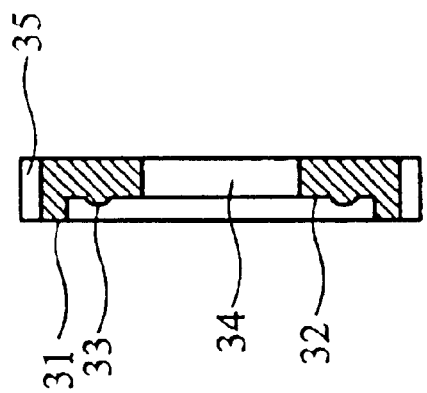
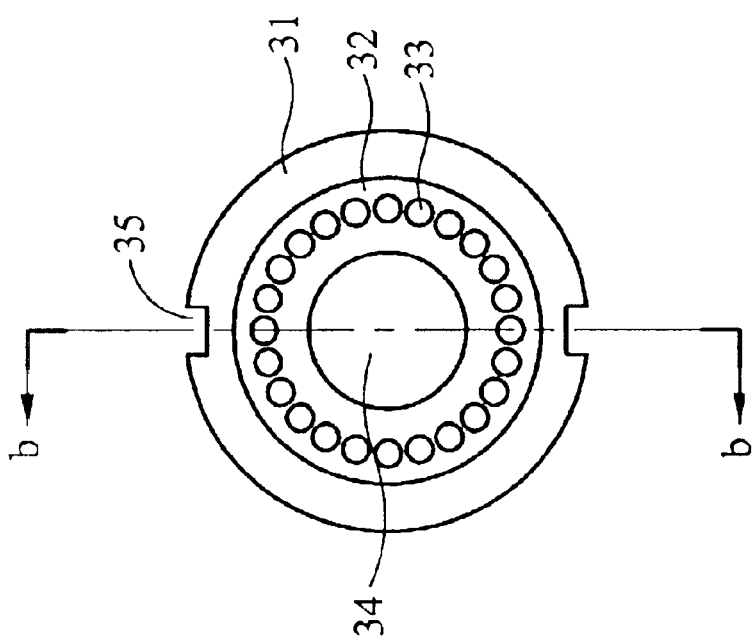
FIG. 3B
FIG. 3A

STEP-ROTATING DEVICE

BACKGROUND OF THE INVENTION

1. Field of the Invention

The present invention relates a step-rotating device. In particular, the present invention relates to a step-rotating device having rollers and a frictional surface with recesses.

2. Description of the Related Art

Liquid crystal displays (LCD) are common plane displays. Compared to cathode ray tube displays (CRT), LCDs have advantages of lower radiation, lower power consumption and smaller profile. FIG. 1 is a drawing of a conventional LCD, including an LCD panel 11, an arm 12, a shaft 13, and a base 14. The arm 12 supports the LCD panel and is rotatably connected to the base 14 by the shaft 13. Thus, users can change the vertical position and the observation angle of the LCD panel 11.

Previously, the shaft 13 has mostly been achieved by a hinge to change the observation angle, but hinges are precise and costly.

SUMMARY OF THE INVENTION

Accordingly, an object of the present invention is to provide a step-rotating device for a plane display without using a hinge, thus reducing the cost and providing stable support.

The present invention provides a step-rotating device for rotatably connecting a first member and a second member. The device includes a gasket movably connected to the first member and having a first surface with a hole, a base fixed on the second member and having a second surface, facing the first surface, with a shaft rotatably inserted into the hole and a plurality of annularly arranged recesses thereon, and a plurality of rollers disposed between the gasket and the base.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 3A is a top view of the gasket of the step-rotating device;

FIG. 3B is a cross-section of line b—b in FIG. 3A;

DETAILED DESCRIPTION OF THE INVENTION

Figure 1:
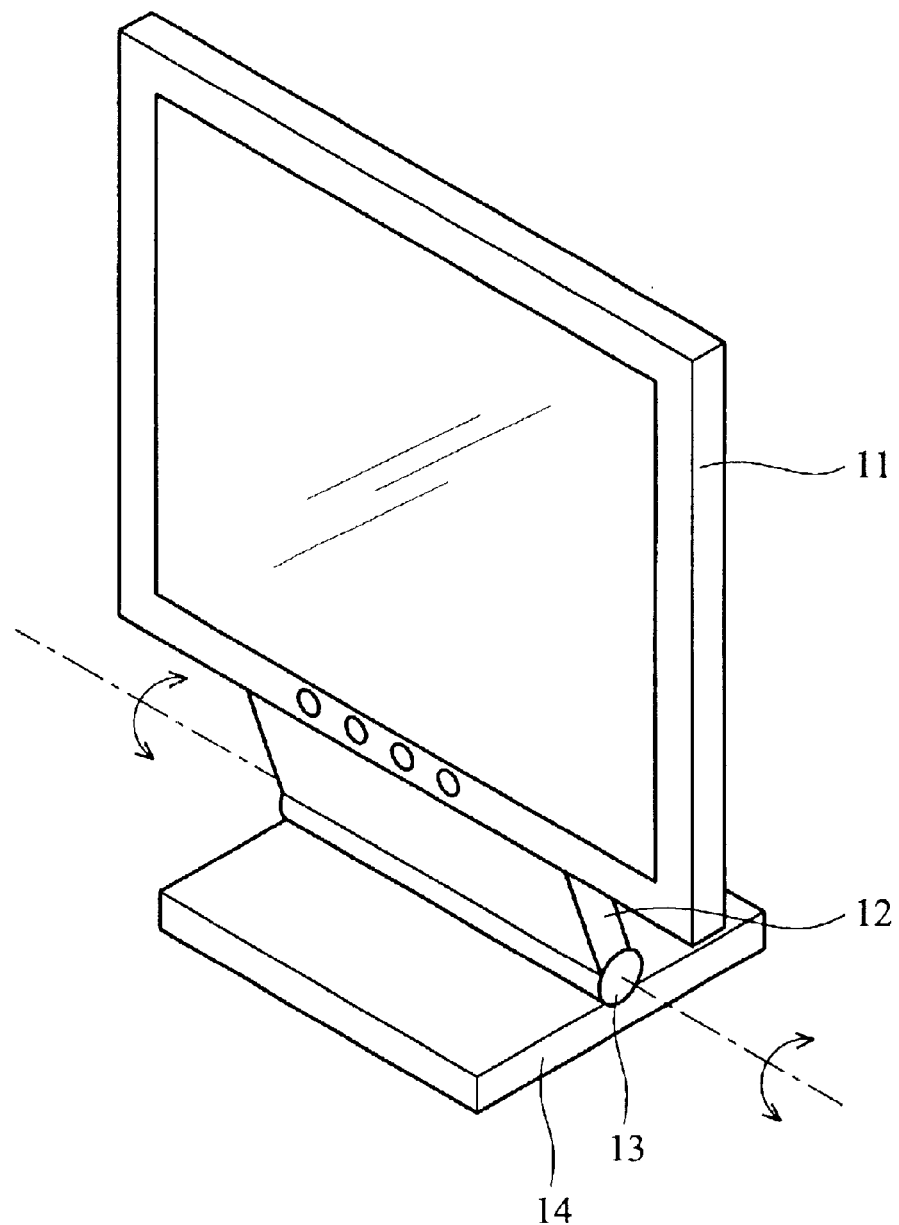
FIG. 1 (Prior Art) a drawing of a conventional LCD.
Figure 2C:
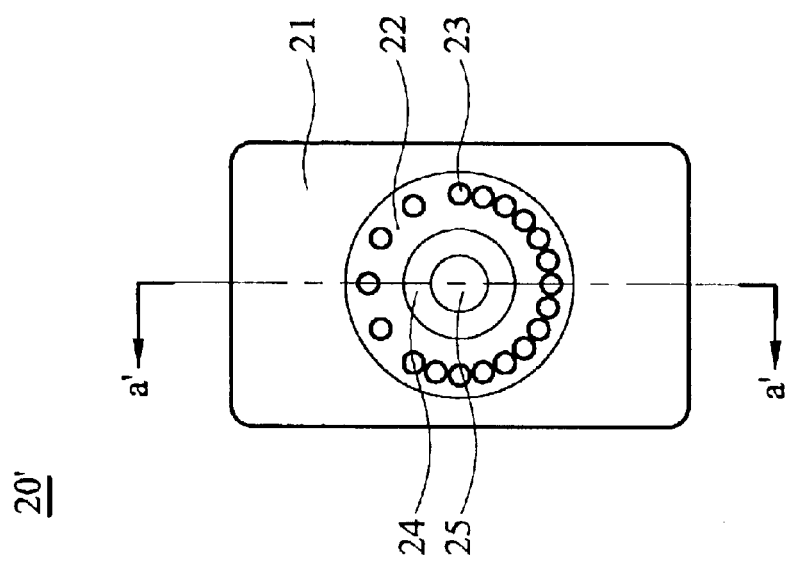
FIG. 2C is a top view of another base with different intervals.
Figure 2B:
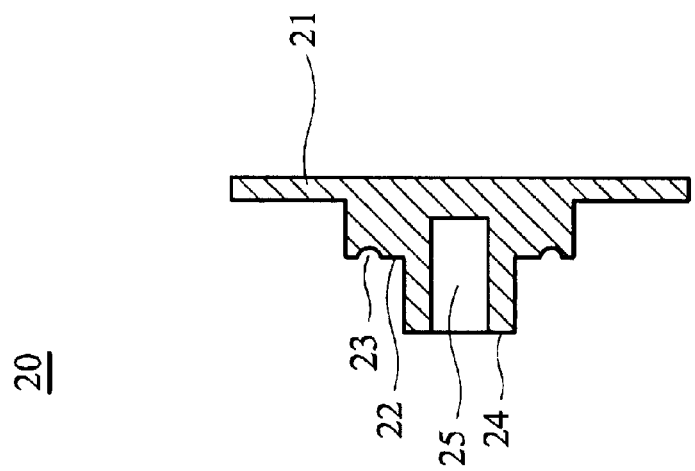
FIG. 2B is a cross-section of line a—a in FIG. 2A.
Figure 2A:
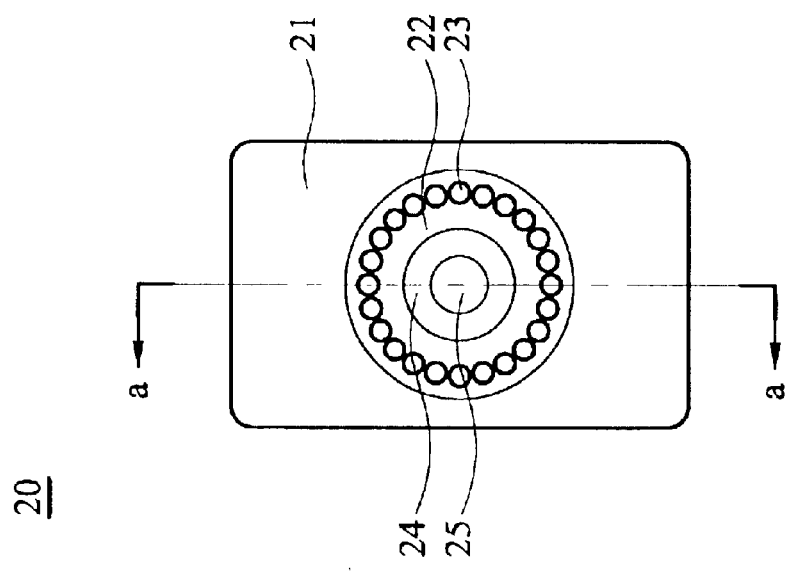
FIG. 2A is a top view of the base of the step-rotating device.

In order to reduce the cost percentage of the rotating mechanism of an LCD, the present invention provides a step-rotating device with a simple structure. FIG. 2A is a top view of the base of the step-rotating device, and FIG. 2B is a cross-section of line a—a in FIG. 2A. In FIGS. 2A and 2B, the base 20 is a cylinder with a flange 21 around the side surface to engage the base 20 with the shell of the LCD panel. On the top surface 22 of the base 20, there are a plurality of annularly arranged recesses 23 with the same intervals and a shaft 24 with a predetermined screw hole 25.

FIG. 3A is a top view of the gasket of the step-rotating device, and FIG. 3B is a cross-section of line b—b in FIG. 3A. In FIGS. 3A and 3B, the gasket 30 is a short cylinder having a surface 32 facing the top surface 22 of the base 20. The gasket 30 also has a circular side wall 31 to fit the shape of the base 20. On the surface 32 within the side wall 31, there is a hole 34 passing through the gasket 30, and a plurality of annularly arranged protrusions 33 matching the recesses 23 of the base 20 in FIG. 2A. The number of the protrusions 33 of the gasket 30 is not limited to the number of the recesses 23 of the base 20. For example, the number of the recesses 23 of the base 20 may be double that of the protrusions 33 of the gasket 30. Thus, the gasket 30 also matches the base 20. Moreover, the intervals of the recesses 23 are not required to be equal. In FIG. 2C, some of the intervals of the recesses 23 on the base 20' are double the normal intervals so that the step-rotating device of the present invention has two kinds of angular tuning intervals. Furthermore, the gasket 30 has two opposite grooves 35 on the side surface to engage the gasket 30 with the arm of the LCD so that the gasket 30 only slides along the direction of the grooves 35.

Figure 4A:
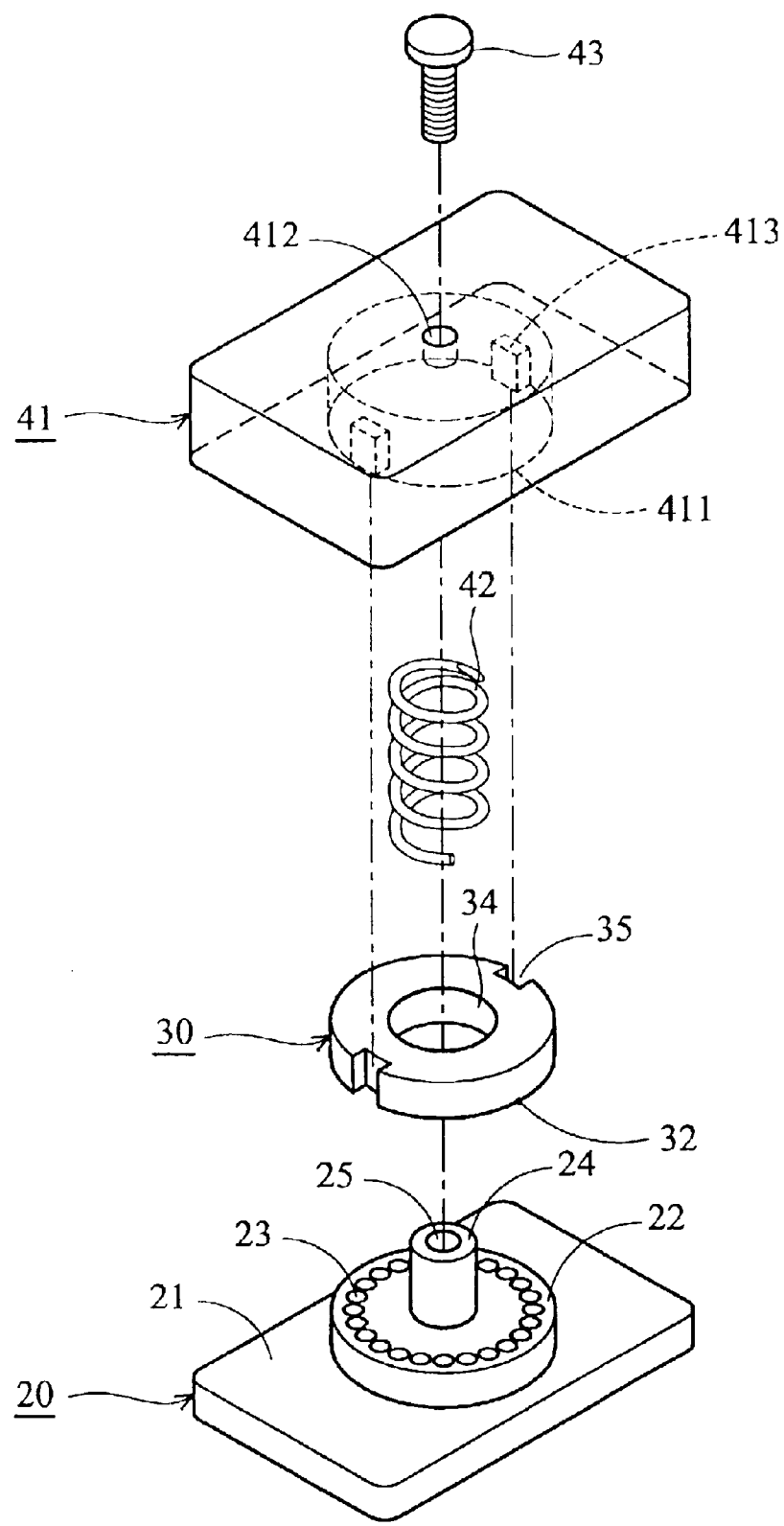
FIG. 4A is an exploded perspective drawing of the step-rotating device.
Figure 4B:
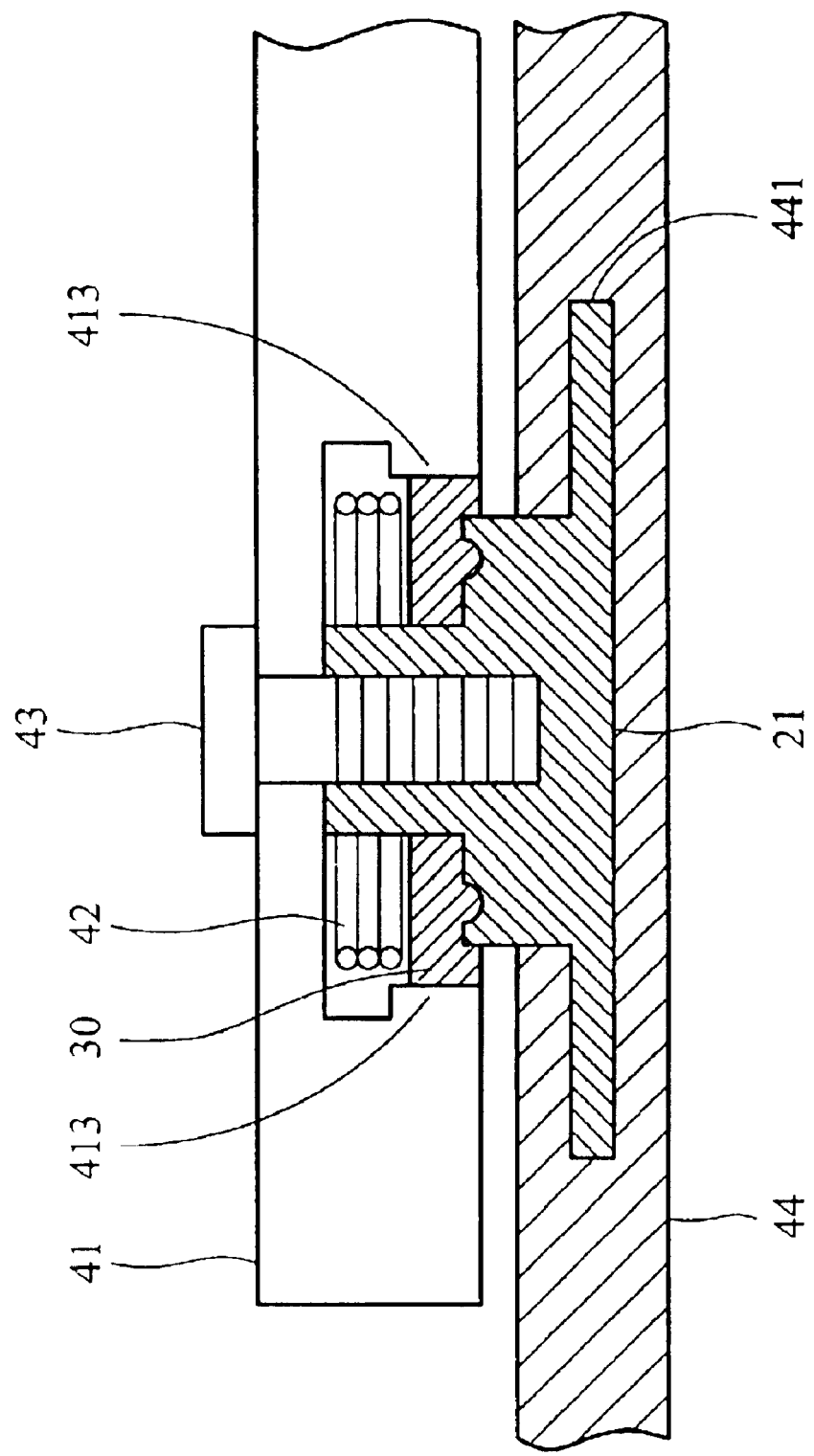
FIG. 4B is a cross-section of the step-rotating device.

FIG. 4A is an exploded perspective drawing of the step-rotating device. In FIG. 4A, the top surface 22 of the base 20 is disposed opposite the surface 32 of the gasket 30. The shaft 24 of the base 20 is rotatably inserted into the hole 34 of the gasket 30. The support arm 41 of the LCD has an assembly cavity 411, a screw hole 412 and two keys 412. When assembling the step-rotating device, the spring 42 is pressed into the assembly cavity 411 by the gasket 30 with the grooves 35 aligning to the key 413 of the support arm 41. After the shaft 24 is inserted into the hole 34, the base 20 is bolted to the support arm 41 by a screw 43. FIG. 4B is a cross-section of the step-rotating device. In FIG. 4B, the flange 21 of the base 20 is fixed by the slot 441 of the shell 44 of the LCD panel. The gasket 30 closely contacts the base 20 by the spring 42 so that the shell 44 of the LCD panel and the support arm 41 are fixed at a predetermined angle. Furthermore, the base 20 of the present invention is rigid material such as metal or plastic, and the gasket 30 is elastic material. When the shell 44 of the LCD panel rotates relative to the support arm 41, the gasket 30 slides back along the key 413 and presses the spring 42 to provide enough space that the protrusions 33 can move into the next recesses 23 and the shell 44 of the LCD panel rotates step by step.

Figure 5B:
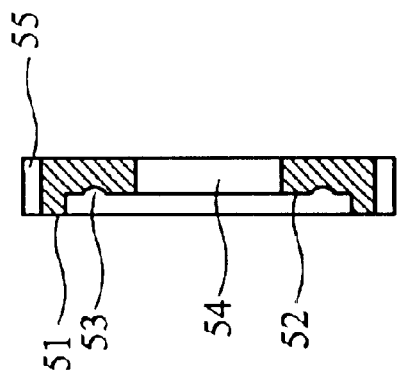
FIG. 5B is a cross-section of line c—c in FIG. 5A.
Figure 5A:
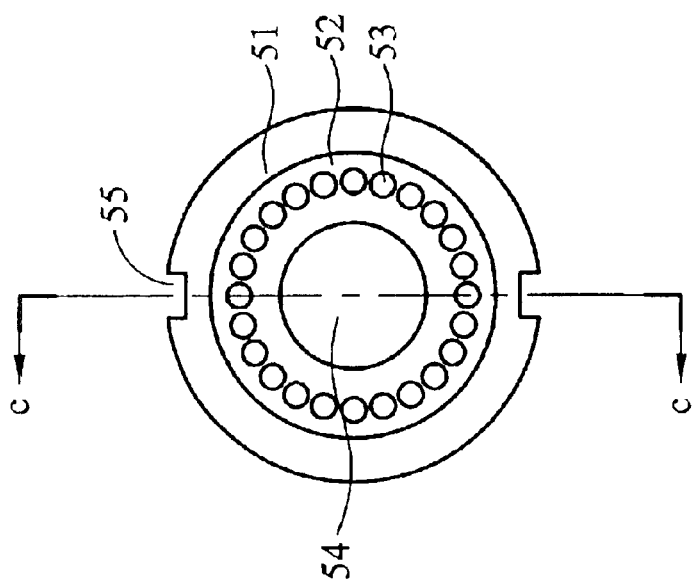
FIG. 5A is a top view of the gasket of the step-rotating device of second embodiment.
Figure 6A:
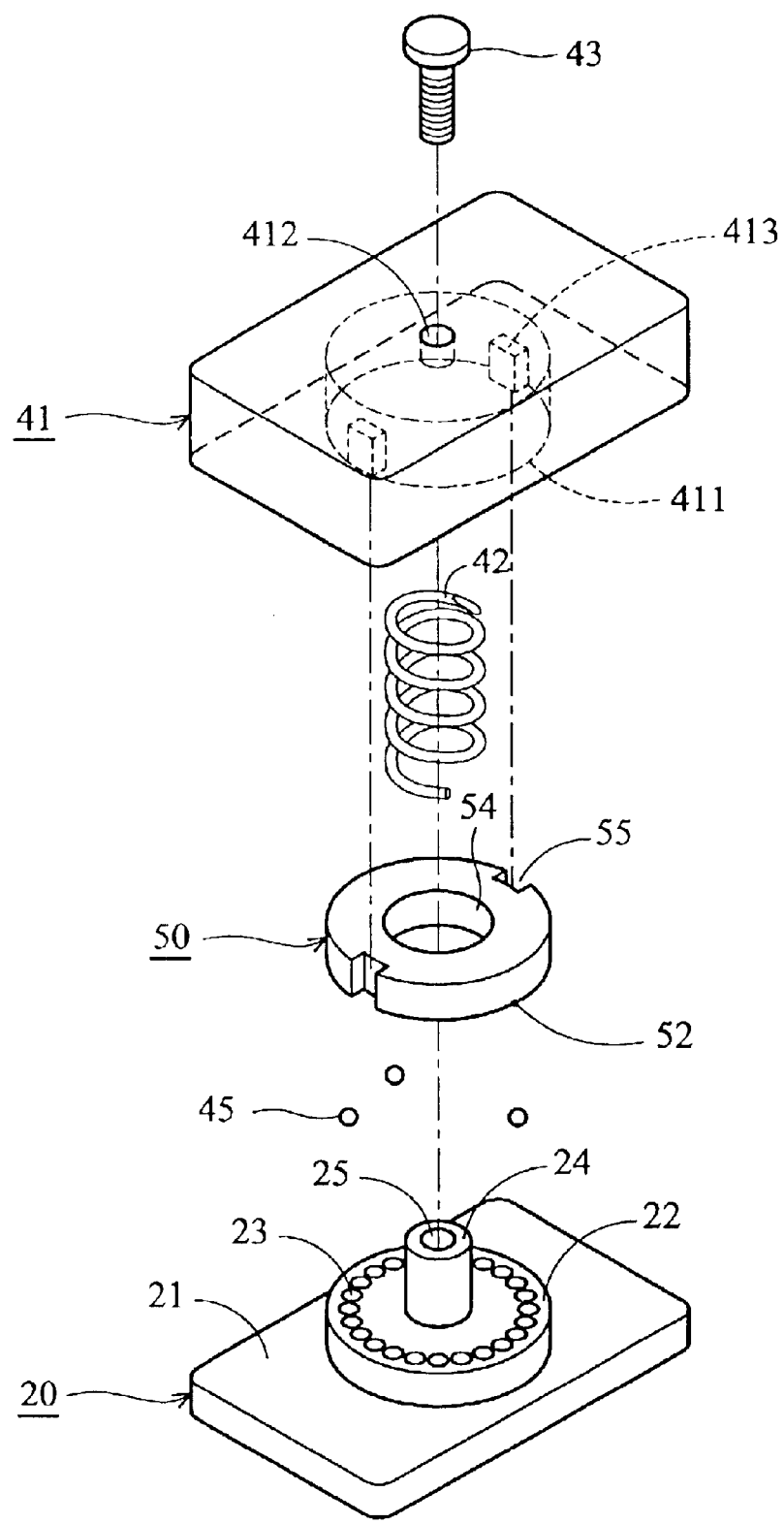
FIG. 6A is an exploded perspective drawing of the step-rotating device of second embodiment.

FIG. 5A is a top view of the gasket of another embodiment of the step-rotating device, and FIG. 5B is a cross-section of line c—c in FIG. 5A. The only difference between the gasket 50 in FIG. 5A and the gasket 30 in FIG. 3A is there are annularly arranged recesses 53 on the surface 52, instead of protrusions 33. The intervals between the recesses 53 on the surface 52 of the gasket 50 are equal to the intervals between the recesses 23 on the top surface 22 of the base 20 in FIG. 2A. FIG. 6A is an exploded perspective drawing of the step-rotating device. In FIG. 6A, there are several rollers 45, or steel balls, arranged between the base 20 and the gasket 50 to replace the protrusions 32 mounted on the gasket 30 in FIG. 3A.

Figure 6B:
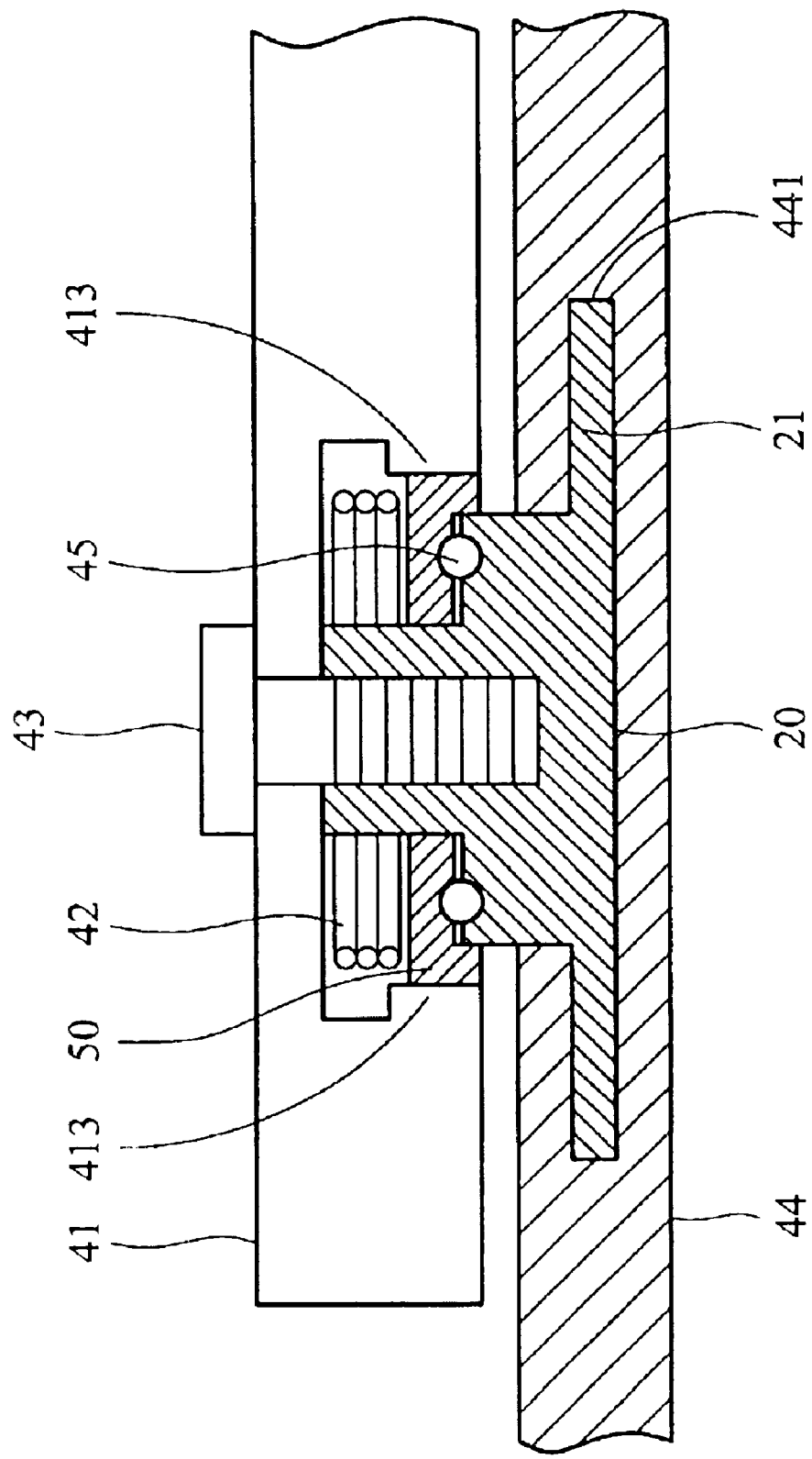
FIG. 6B is a cross-section of the step-rotating device.

In FIG. 6A, the top surface 22 of the base 20 is disposed opposite the surface 52 of the gasket 50. The shaft 24 of the base 20 is rotatably inserted into the hole 54 of the gasket 50. The support arm 41 of the LCD has an assembly cavity 411, a screw hole 412 and two keys 412. When assembling the step-rotating device of the second embodiment, the spring 42 is pressed into the assembly cavity 411 by the gasket 50 with the grooves 55 aligning to the key 413 of the support arm 41. After the shaft 24 is inserted into the hole 54, the base 20 is bolted to the support arm 41 by a screw 43. FIG. 6B is a cross-section of the step-rotating device in this embodiment. In FIG. 6B, the flange 21 of the base 20 is fixed by the slot 441 of the shell 44 of the LCD panel. The base 20, the gasket 50 and the rollers 45 are rigid material, such as metal or plastic. Thus, when the shell 44 of the LCD panel rotates relative to the support arm 41, the gasket 50, pressed by the rollers 45, slides back along the key 413 and presses the spring 42 to provide enough space so that the rollers 45 move into the next recesses 23, 53 and the shell 44 of the LCD panel rotates step by step.

Figure 7:
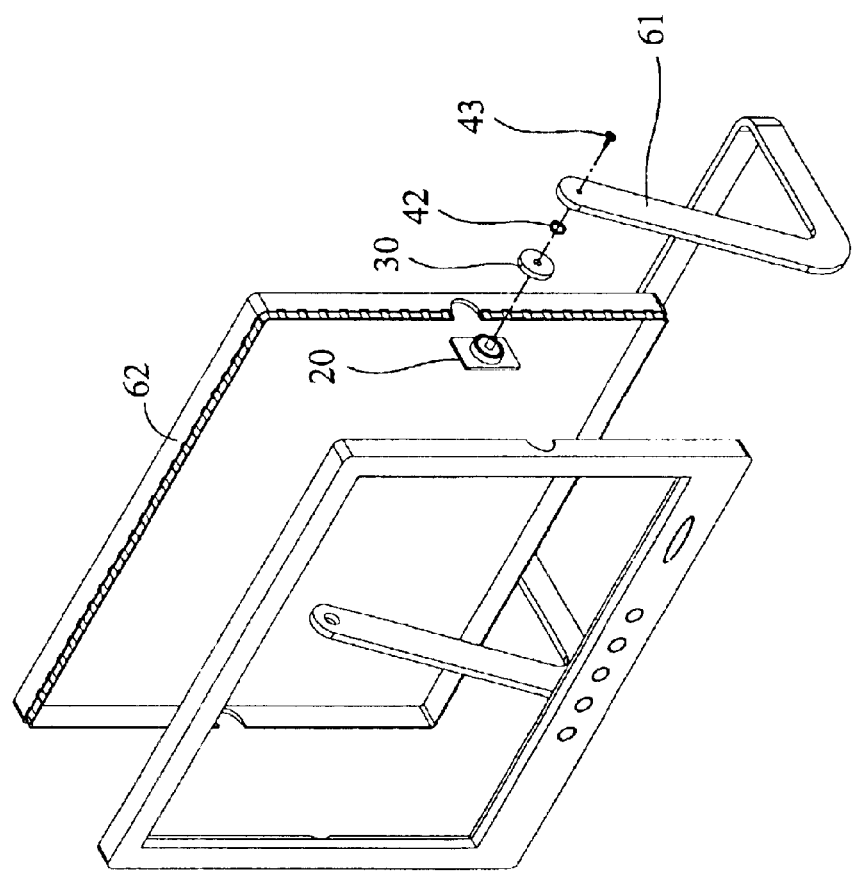
FIG. 7 is an exploded perspective drawing of the LCD panel using the step-rotating device of the present invention.

FIG. 7 is an exploded perspective drawing of the LCD panel using the step-rotating device of the present invention. In FIG. 7, the base 20 is first engaged with the shell 62 of the LCD panel. The screw 43 bolts the strut 61 to the base 20 with the spring 42 and the gasket 30 therein so that users can easily change the observation angle of the LCD panel. Moreover, when the base 20 is fixed at the center of the back surface of the shell 62, the step-rotating device of the present invention also provides a step-rotating mechanism for wall-mounted plane displays.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A step-rotating device for rotatably connecting a first member and a second member, comprising:
   a gasket, movably connected to the first member and having a first surface with a first hole;
   a base, fixed on the second member and having a second surface facing the first surface, including a shaft portion, integral with the second surface and having a second hole, the shaft portion rotatably inserted in the first hole, the second surface having a plurality of annularly arranged recesses;
   a plurality of protrusions, annularly arranged and fixed on the first surface of the gasket, matching the recesses of the base;
   an elastomer disposed between the gasket and the first member; and
   a screw inserted in the second hole of the shaft portion to connect the first member and the base.

2. The step-rotating device as claimed in claim 1, wherein the elastomer is a spring.

3. The step-rotating device as claimed in claim 1, wherein the recesses on the second surface have the same intervals.

4. The step-rotating device as claimed in claim 1, wherein the protrusions and the gasket are elastic material.

5. The step-rotating device as claimed in claim 1, wherein the base is plastic.

6. The step-rotating device as claimed in claim 1, wherein the base is rigid material.

7. The step-rotating device as claimed in claim 1, wherein the base is metal.

8. A step-rotating device for connecting a first member and a second member, comprising:
   a gasket movably connected to the first member and having a first surface with a first hole and a plurality of annularly arranged first recesses;
   a base fixed on the second member and having a second surface facing the first surface, including a shaft portion integral with the second surface and having a second hole, the shaft portion rotatably inserted in the first hole, the second surface having a plurality of annularly arranged second recesses therein; and
   a plurality of rollers disposed between the gasket and the base;
   an elastomer disposed between the gasket and the first member; and
   a screw inserted in the second hole of the shaft portion to connect the first member and the base.

9. The step-rotating device as claimed in claim 8, wherein the elastomer is a spring.

10. The step-rotating device as claimed in claim 8, wherein the second recesses on the second surface have the same intervals.

11. The step-rotating device as claimed in claim 8, wherein the first recesses on the first surface match the second recesses on the second surface.

12. The step-rotating device as claimed in claim 8, wherein the base, the gasket and the rollers are rigid material.

13. The step-rotating device as claimed in claim 8, wherein the base and the gasket are metal.

14. The step-rotating device as claimed in claim 11, wherein the base and the gasket are plastic.

15. The step-rotating device as claimed in claim 11, wherein the rollers are steel balls.

* * * * *